April 19, 1932.  C. F. JENKINS  1,854,742
CHRONOTEINE OR HIGH SPEED CAMERA
Filed Jan. 21, 1926  2 Sheets-Sheet 1
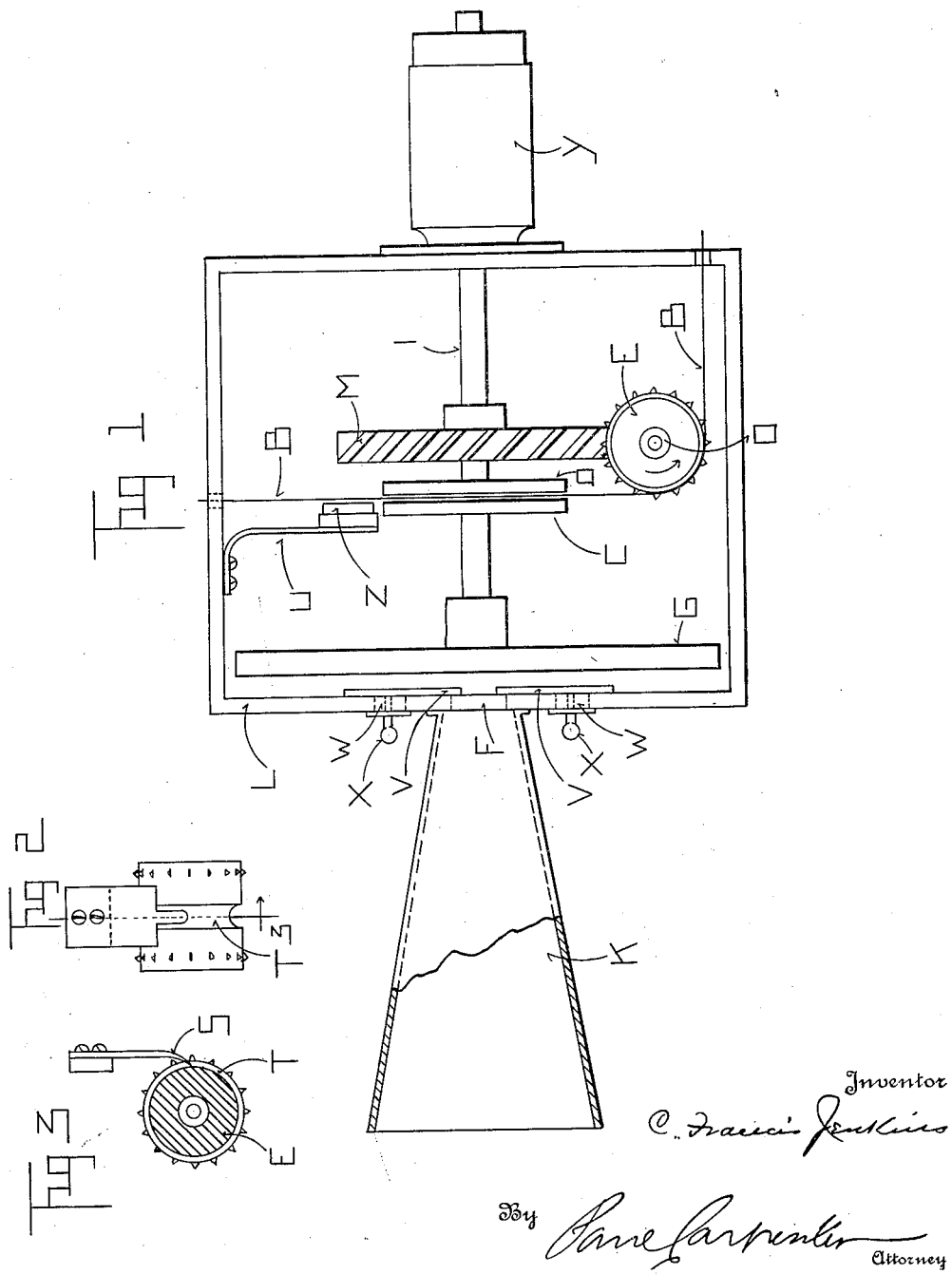

April 19, 1932.     C. F. JENKINS     1,854,742
CHRONOTEINE OR HIGH SPEED CAMERA
Filed Jan. 21, 1926   2 Sheets-Sheet 2
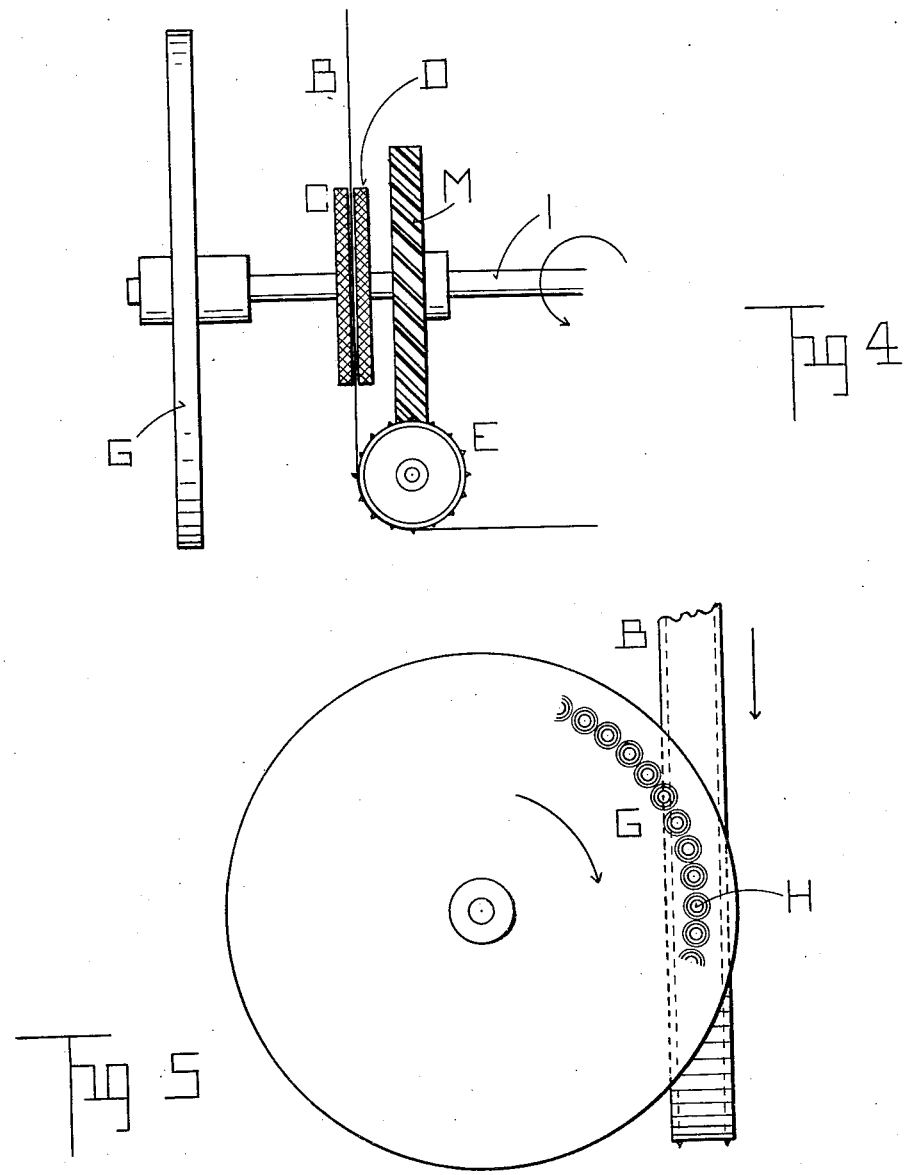

Patented Apr. 19, 1932

1,854,742

UNITED STATES PATENT OFFICE

CHARLES FRANCIS JENKINS, OF WASHINGTON, DISTRICT OF COLUMBIA, ASSIGNOR TO JENKINS LABORATORIES, OF WASHINGTON, DISTRICT OF COLUMBIA, A CORPORATION OF THE DISTRICT OF COLUMBIA

CHRONOTEINE OR HIGH SPEED CAMERA

Application filed January 21, 1926. Serial No. 82,810.

Among the objects of this invention is to provide devices for producing motion pictures at a rate many times that until recently considered possible, a rate of 4000 a second having been attained. This rate renders possible analysis of the movement of a body at such high speed that its positions could not heretofore be recorded at desirably short intervals.

The principal objects and advantages of my invention reside in the provision generally of an improved method of and apparatus for photographing moving objects; the provision of an improved method of and apparatus for producing motion pictures taken at a relatively high speed to the extent of producing even many hundeds of photographic representations per second whereby motions may be analyzed; the provision of an improved method of and apparatus for photography, which includes refracting the light rays in substantial synchronism with the motion of the light sensitive body, that is, the film or plate; the provision of an improved method of photography, which is characterized by the movement of the light ray transmitting member and light sensitive member in substantial synchronism; the provision in such a method of a step of masking the light sensitive member to prevent overlapping of the images impressed thereon; and the provision, in the method referred to, of an air cushion for the moving film to prevent friction and reduce the fire hazard.

This invention is further characterized by the provision of an improved apparatus for photographing objects, particularly objects in motion, which includes a light transmitting member and a light sensitive member, and means for moving them in substantial synchronism; the provision in apparatus of the kind described of means for moving a film at a predetermined rate of speed, and means for moving a lens group at substantially the same rate of speed without substantial relative displacement during exposures; the provision in an apparatus of the character described of means for continuously moving a film and a lens group in substantial synchronism and masking each exposure to prevent overlapping of photographic impressions; the provision of an apparatus of the character referred to, which has a high rate of acceleration; the provision of an apparatus of the character described including an improved air cushioned guiding means or tension plate for the light sensitive element; the provision in a camera of means which affords a longer rate of exposure than has heretofore been possible with the intermittent feed motion picture camera now in commercial use; the provision of an improved guiding means for the film characterized by the provision of an air cushion on each side of the film; the provision of an improved camera characterized by the employment of means for attaining a marked steadiness of the camera with consequent perfection of registry of the images relatively to one another when the film is projected, and further so doing by producing a gyroscopic effect; the provision of an improved camera characterized by the employment of means for producing a uniform feed of the film, and further so doing by the provision of means which exert a constant pull on the film; the provision of means for lubricating the film; the provision of means for limiting the engagement of the film with film feeding means; the provision in a camera of improved light limiting means; the provision in a camera of improved picture framing means; and the provision of a device of the character described, which is compact, sturdy in construction, and highly efficient in operation.

In the accompanying diagrammatic drawings,

Figure 1 is a vertical view partly in section, of a camera embodying my present invention with one of the side covers removed;

Figure 2 is an elevational view of a detail;

Figure 3 is a sectional view taken on the line 3—3 of Figure 2;

Figure 4 is a fragmentary elevational view of a portion of the camera of Figure 1, and Figure 5 is a fragmentary end elevational view of the apparatus of Figure 4.

In these views, B represents a sensitized film constantly drawn between glass plates C, D, and past an exposure opening F by a sprocket drum E, the height of the opening being approximately equal to twice the vertical width of a picture. This increases the amount of light which is permitted at any instant to reach the film, and assures pictures of sharpness and good definition, which in all cameras of this character known to me has been impracticable. The plates C, D, are spaced apart a sufficient distance so as to provide a passage in which the film moves spaced from the guides by a cushion of air, it having been found that this arrangement affords a substantially frictionless bearing for the rapidly moving film, and thus practically eliminates the fire hazard present where the film actually contacts with the guide, and, at the same time, removes, in a large degree, the inertia of the film due to friction in the guides, avoids tearing the film, and permits of the high rate of acceleration necessary in cameras of the character of this invention.

In front of the plates C, D, is a rotary lens carrier G, having in its peripheral zone a series of substantially identically similar lenses H, and carried by a shaft I. It will be observed from Fig. 1 that the lens carrier is so positioned that each lens, as it passes the exposure opening F, moves in a substantially straight line with the movement of the film, that is, the size of the lens carrier makes the arc of movement of the lens relatively small, and this, coupled with the relatively short duration of exposure, prevents any deleterious distortion of the picture produced.

For limiting the field of rays entering the aperture F, there is provided a tubular masking means K which is preferably of greater length than transverse dimension, and of the desired cross section (which is normally rectangular in order to give the conventional contour to the picture to be photographed for projection), the tubular mask being generally flaring as clear from inspection of Figure 1, as I find desirable in order to attain the desired sharpness of definition.

For varying the area of the exposure aperture and thereby the volume of light admitted therethrough, I provide screens V, V, arranged to move relatively to said aperture and to each other, preferably, above and below the aperture, by the provision of slots, W, W, in the front wall L, of the camera, securing said screens by set screws X, X, passing through said slots. The carrier shaft I bears a gear M, which meshes with a pinion (not shown) upon the shaft O of the sprocket drum, so that the film and the lenses have, at the exposure point, substantially precisely the same speed without substantial relative displacement. The shafts may be rotated at the desired speed by a suitable device, which is conveniently a high-speed electric motor Y (preferably of the series wound D. C. type) directly connected to the shaft I for imparting rotation to said shaft at a substantially uniform rate of acceleration so as to produce and maintain a rate of speed which will exert a constant pull on the film. Owing to the inherent high rate of speed of said motor, coupled with the weight of the lens carrier G, a gyroscopic effect is attained, markedly tending to steady the camera in operation.

The lens carrier must, of course, be constructed of such nature that, at the high rate of acceleration and speed at which it must move, it has the required strength and yet permits of the high rate of acceleration necessary. The lens disc is conveniently constructed of an alloy of magnesium and copper, and weighs but sixty per cent of the normal weight of a similar body of aluminum, machines like soft gray iron, and requires no aging or seasoning and does not flex in use.

In the film guide the air cushion is amply supplied by spacing the plates C, D, about seven thousandths inch (.007″) for the passage of a five thousandths inch (.005″) (thickness) film, this arrangement holding the film flat without undue tension or friction.

The film strip B as it enters the camera from the supply reel (not shown), passes adjacent to the lubricated guide element Z carried by a bracket U secured to a wall of the camera. The element Z is preferably of a material (soft as paraffin) having a low melting point and of a nature to melt superficially when touched by the film B when moving at a rate of speed sufficient to produce heat instantaneously.

To overcome any tendency of the film strip B to prolong undesirably its engagement with the sprocket E, I provide a stripper element including the finger S secured to a convenient part of the camera having its free terminal curved toward the sprocket E and riding in a circumferential groove T formed therein.

By increasing the size of the light aperture and moving the film and lenses substantially without relative displacement at the instant of exposure and masking the light rays from immediately adjacent parts of the film, I am enabled to increase the degree of exposure and employ the ordinary commercial super-speed negative film. Ordinarily, not over ten per cent exposure is obtainable with an intermittently moved film, but I am enabled to get more than one-hundred and fifty per cent exposure of the film, even at rates of speed where thirty-two hundred (3200) pictures per second are made with sixteen (16) pictures per foot of the film.

The gears employed are of a well-known type without "backlash", or appreciable lost motion, the film and lens-directed light beams move substantially exactly together, as they must to give satisfactory pictures at the extremely high speed mentioned.

Having described the invention what is claimed is:

1. In a camera arranged to expose a film strip, a movable film strip, means for continuously feeding the said film strip and for exerting a constant pull on the same, and fixed guiding means for the strip consisting of transparent plates located in line with the exposure aperture of the camera and spaced from each other a distance materially greater than the film thickness to form air cushions consisting substantially entirely of entrained air interposed between the plates and both faces of the film strip when the film strip is moving at uniform high speed.

2. In a high speed motion picture camera a film strip, a pair of guide plates for said film, said guide plates being spaced apart a distance materially greater than the film thickness, and means for moving said film at a uniform high speed through said guides to entrain sufficient air between the film and guides to provide an effective air cushion adjacent both faces of the film.

3. A camera according to clam 2 in which the entrained air serves to maintain both faces of the film entirely out of contact with the guide plates.

4. In a high speed motion picture camera, the combination of a film strip, an adjustable exposure aperture capable of exposing at least two picture sections at the same time, means for moving said film in a straight line and continuous motion past said aperture, a circular disc carrying a plurality of lenses arranged in a circle all at the same distance from the axis of said disc, and means for rotating said disc in a plane parallel to the film, and synchronously with the movement of the film.

In testimony whereof I affix my signature.

CHARLES FRANCIS JENKINS.